INVENTORS
Lenard P. Adams.
Roy S. Adams.

United States Patent Office 3,605,315
Patented Sept. 20, 1971

3,605,315
AUTOMATIC FISH CATCHER
Lenard P. Adams and Roy S. Adams, both of 2126
56th St., Dallas, Tex. 75216
Filed July 18, 1969, Ser. No. 856,228
Int. Cl. A01k 97/12
U.S. Cl. 43—16           2 Claims

ABSTRACT OF THE DISCLOSURE

An automatic fish catcher which embodies a spring-loaded structure having a vertically-disposed member in the form of a tube that has its lower end either inserted in the ground or secured to the gunwale of a boat. An elongated Z-shaped member is hinged at the end of a lower leg thereof to a member extending horizontally outwardly from the tube and has an upper leg spring-biased against the tube. A trigger is pivoted intermediate its ends on the tube and has a roller at one end biasing the Z-shaped member away from the tube in the set position of the device with a fishing line secured to the said one end of the trigger and freely passing through an eye on the upper end of the Z-shaped member. A pull on the line will release the trigger to set the hook and the trigger movement will notify the fisherman that he has a bite.

---

This invention relates to fishing tackle and, more particularly, to a piece of fishing tackle that does away with the necessity of a man having to sit for long periods of time and hold the fishing line in hand while waiting for a catch.

While many people like to fish, they also object to having to sit and hold the fishing rod or line, particularly if the fish are slow in biting, no matter how good they may be after they are caught and cooked.

It is, therefore, the principal object of this invention to provide a piece of fishing tackle that, by reason of its ability to not only hold the fishing line but also to permit the necessary amount of movement of the same when a fish has been caught on its hook, will both prevent the line from breaking and visually notify the fisherman that he has a bite.

Another object of this invention is to provide an automatic fish catcher that can be used either on the side of a river or stream or secured to the side of a boat.

Another object of this invention is to provide an automatic fish catcher that, with the exception of necessary connecting pins and other fastening members, is made almost entirely out of tubing and strips of metal.

Another object of this invention is to provide an automatic fish catcher that can be manufactured and sold to the public at a price within nearly everyone's reach.

Another object of this invention is to provide an automatic fish catcher that does not contain any complicated mechanisms to bind or otherwise become inoperative and thus make the invention useless when it is most needed.

Still another object of this invention is to provide an automatic fish catcher that makes it possible for a fisherman to have any number of lines in the water at the same time.

Other objects will appear hereinafter.

The invention consists in the combinations and arrangements of parts hereinafter shown, described and claimed.

The invention will be best understood by reference to the accompanying drawings forming a part of this application, and in which.

Figure 1:
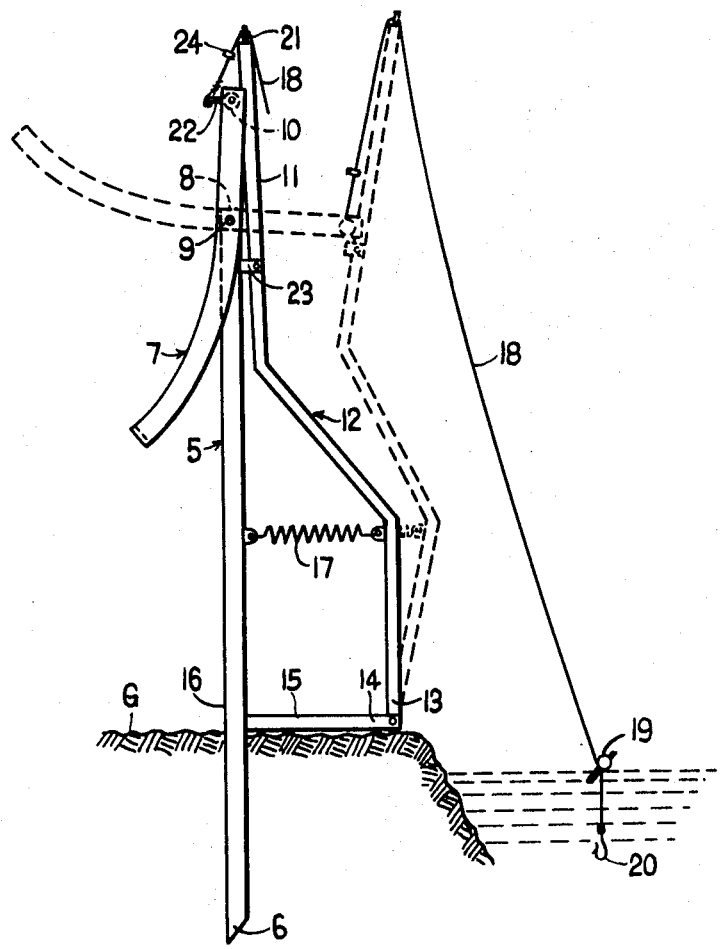
FIG. 1 is a side view of this invention secured in the side of a stream, with solid lines showing its position when a fish has been caught, and showing in dash lines the position of the various parts when they are set, waiting for a bite.

The automatic fish catcher illustrated in FIG. 1 comprises a tube 5, having a pointed lower end 6 that is normally stuck into the ground G when one is fishing with this piece of tackle. A curved trigger 7 is swingably secured to the upper end 8 of the aforesaid tube 5 by means of the pin 9, as clearly shown in both FIGS. 1 and 2 of the drawing. The curved trigger 7 is formed from a single strip of metal into a shape that appears as an elongated capital letter U when viewed from the front or back. The curved trigger 7 has a roller 10 mounted between, and supported by, the two sides of this part of the invention. The roller 10 is at all times in direct rolling contact with the upper and straight portion 11 of a Z-shaped member 12 that has its lowermost end 13 swingably connected to the outer end 14 of the horizontally-disposed and fixed member 15 that, in turn, is secured to the lower portion 16 of the tube 5. A coiled spring 17 has one end secured to the tube 5 and the other end secured to the member 12, thereby providing an extremely simple and practical means of keeping the upper and straight portion 11 of the member 12 tight up against the roller 10 of this invention. The fishing line 18, having a float 19 and a hook 20 secured to one end thereof, has its other end passing through the screw-eye 21 that is located in the free end of portion 11, and attached to the inverted U-shaped line holder 22. A U-shaped stop 23 is adjustably secured to the portion 11 in order to control the swinging movement of both the trigger 7 and the elongated Z-shaped member 12. Further control of this novel automatic fish catcher is obtained by the use of an adjustable clip 24, that is secured on the fishing line 18 between the screw-eye 21 and the inverted U-shaped line holder 22, in order to prevent the fishing line 18 from slipping back through the screw-eye 21 when assembling the device.

Figure 3:
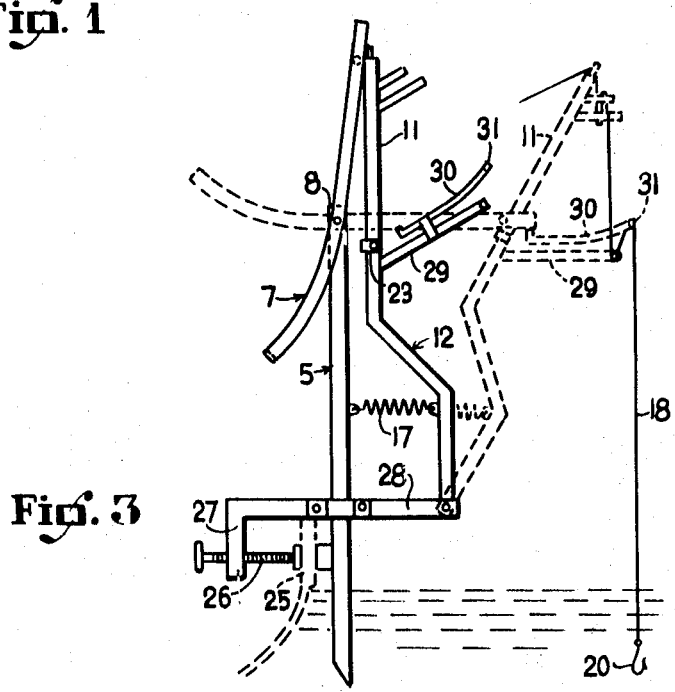
FIG. 3 is a side view of a modified form of this invention, showing it secured to the side of a boat, with dash lines again showing its position when set waiting for a bite.

In the modified form of this invention, illustrated in FIG. 3 of the drawing, all parts that are like those already described in detail are noted on the figure by like reference numbers. In this modified form of construction, the entire device is clamped to the gunwale 25 of a boat by means of a horizontally-disposed clamp screw 26, that is located in the vertical end 27 of the horizontally-disposed member 28 that replaces the member 15 in the first described form of this invention. In this modified form of the device, the horizontally-disposed member is adjustably clamped to the tube 5. The Z-shaped member 12 of this modified form of an automatic fish catcher is provided with a cantilever type of arm 29, on top of which is mounted the lever 30 having an upwardly-curved outer end 31, to which is attached a prong (not shown) over which passes the fishing line 18 that also passes under a similar type of prong that is mounted on the outermost end of the arm 29. Continuing to look at FIG. 3, one will see that the lever 30, which is pivoted to the arm 29, has its inner end curved upward in order to contact the uppermost end of the trigger 7 when the automatic fish catcher is set in the waiting position for a fish to bite on its line, as is shown in the dash lines ont he right hand side of FIG. 3. Both of the prongs are omitted in FIG. 3 for reasons of clarity, since the device must naturally be drawn to a rather small scale.

After the fishing line 18 passes under the prong on arm 29, the line extends upward to pass over and under a plurality of prongs mounted in the outer end of the portion 11 and onto the rod and reel for which this type of the invention is ideally suited. Neither the rod nor reel are shown in any of the views of the drawing since they do not form any part of this invention and no claims are made for the same.

In operation, the fish catcher is set as shown in dashed lines in FIG. 1. When a fish pulls on the hook, the line pulls on the end of trigger 7, raising this end enough to permit the spring 17 to move the Z-shaped member 12 and trigger 7 to the position shown in solid lines in FIG. 1 and in FIG. 2. The movement of the trigger 7 and Z-shaped member 12 will pull on the line and set the hook. This movement will also notify the fisherman that he has a bite.

Figure 2:
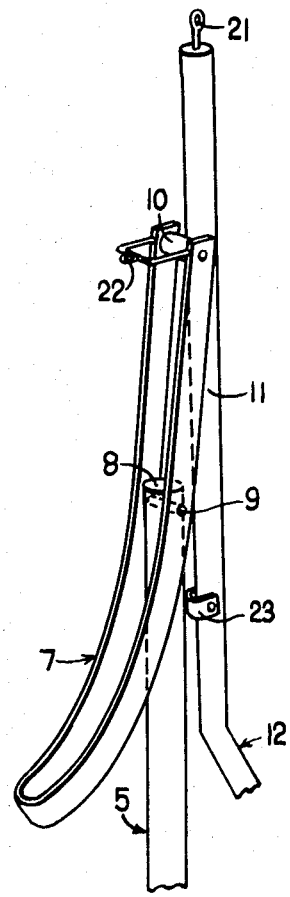
FIG. 2 is a perspective view of the upper end of this invention.

The modification of FIG. 2 is set as shown in dash lines in FIG. 3. The fish line is wound around prongs on cantilever-type arm 29, lever 30, and Z-shaped member 12. When a fish pulls on hook 20, the force is transmitted through line 18 to lever 30. Lever 30 pivots about its pivot and its upturned end raises the end of trigger 7 sufficiently to permit the spring 17 to move the elements to their full line position. Here again, the hook is set and the fisherman notified. The line 18 can be easily released from the prongs and the fish played with a rod and reel in the usual way.

While we have now shown our invention in both its original and modified forms, the purpose and operation of each has been fully described, it is to be understood that the arrangement and configuration of the parts may vary in so long as they fall within the spirit and intent of the appended claims.

What we now claim as our invention of an automatic fish catcher, and desire to secure by Letters Patent is:

1. An automatic fish catcher of the character described, comprising an elongated vertical tube having a pointed lower end that is normally placed in the ground near the edge of a body of fish-containing water; and a curved trigger that is swingably connected to the upper end of said tube and having one end extending outwardly therefrom, a roller mounted on said one end of said trigger, and an elongated Z-shaped member pivotally secured at one end of said vertical tube, spring means biasing the other end of said Z-shaped member toward said vertical tube and said one end of said trigger, said roller being adapted to engage said other end of said Z-shaped member and to urge said other end away from said vertical tube when said trigger is pivoted toward said Z-shaped member, an inverted U-shaped member secured to said one end of said trigger; and a fishing line, having a fishhook on the free end thereof, being supported by the upper and free end of the said elongated spring-loaded Z-shaped member as well as being secured to said inverted U-shaped member that is fastened to the said one end of the said trigger.

2. An automatic fish catcher of the character described, comprising an elongated vertical tube; a horizontally disposed member secured intermediate its ends to the lower portion of said tube; a horizontally disposed clamping screw; means securing said screw to one end of said horizontally disposed member to permit clamping the gunwale of a boat between said clamping screw and the lower end of said tube; a trigger swingably connected to the upper end of said tube and having one end extending outwardly therefrom; a roller mounted on said one end of said trigger; an elongated Z-shaped member pivotally secured at one end to the other end of said horizontally disposed member; spring means biasing the other end of said Z-shaped member toward said vertical tube and said one end of said trigger, said roller being adapted to engage said other end of said Z-shaped member and to urge said other end away from said vertical tube when said trigger is pivoted toward said Z-shaped member; and a fishing line supported by the upper end of said elongated Z-shaped member as well as being secured to said one end of said trigger.

References Cited

UNITED STATES PATENTS

| | | | |
|---|---|---|---|
| 1,549,405 | 8/1925 | Bjurstrom | 43—15 |
| 2,898,697 | 8/1959 | Housman | 43—15 |

FOREIGN PATENTS

| | | | |
|---|---|---|---|
| 96,550 | 8/1939 | Sweden | 43—15 |

SAMUEL KOREN, Primary Examiner

D. J. LEACH, Assistant Examiner